(12) United States Patent
Chen et al.

(10) Patent No.: US 12,107,717 B2
(45) Date of Patent: Oct. 1, 2024

(54) BEAM FAILURE RECOVERY METHOD AND DEVICE AND COMMUNICATION SYSTEM

(71) Applicant: FUJITSU LIMITED, Kawasaki (JP)

(72) Inventors: Zhe Chen, Beijing (CN); Lei Song, Beijing (CN); Xianjun Yang, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 251 days.

(21) Appl. No.: 17/481,386

(22) Filed: Sep. 22, 2021

(65) Prior Publication Data

US 2022/0006686 A1 Jan. 6, 2022

Related U.S. Application Data

(63) Continuation of application No. PCT/CN2019/080216, filed on Mar. 28, 2019.

(51) Int. Cl.
*H04L 41/0654* (2022.01)
*H04W 72/1273* (2023.01)
(Continued)

(52) U.S. Cl.
CPC ..... *H04L 41/0654* (2013.01); *H04W 72/1273* (2013.01); *H04W 72/23* (2023.01); *H04W 74/006* (2013.01); *H04W 74/008* (2013.01)

(58) Field of Classification Search
CPC . H04L 41/0654; H04L 5/0053; H04L 5/0057; H04L 5/0082; H04L 5/0098; H04W 72/1273; H04W 72/23; H04W 74/006; H04W 74/008; H04W 74/0833; H04B 7/0695; H04B 7/0408; H04B 7/0617; H04B 17/373
See application file for complete search history.

(56) References Cited

U.S. PATENT DOCUMENTS 10,813,157 B1 * 10/2020 Bai .................. H04W 72/21
10,904,940 B2 * 1/2021 Zhou ................ H04W 72/23
(Continued)

FOREIGN PATENT DOCUMENTS

CN 109151869 A 1/2019
CN 109391405 A 2/2019
(Continued)

OTHER PUBLICATIONS

Notice of Reasons for Refusal issued by the Japan Patent Office for corresponding Japanese Patent Application No. 2021-556932, mailed on Nov. 8, 2022, with an English translation.
(Continued)

*Primary Examiner* — Brian T O Connor
(74) *Attorney, Agent, or Firm* — Myers Wolin, LLC

(57) ABSTRACT

A beam failure recovery method and device and a communication system. The device includes: a receiver configured to, after a period of time upon the terminal equipment receive a beam failure recovery (BFR) response and before activation or reconfiguration signaling, monitor and/or receive a downlink signal in a first cell of the terminal equipment according to an antenna quasi-co-located (QCL) parameter identical to a selected reference signal (q_new) or a reference signal (q_new) indicated by a higher layer.

14 Claims, 7 Drawing Sheets

(51) Int. Cl.
*H04W 72/23* (2023.01)
*H04W 74/00* (2009.01)

(56) References Cited

U.S. PATENT DOCUMENTS

| | | | | |
|---|---|---|---|---|
| 11,206,655 | B2* | 12/2021 | Moon | H04L 1/0046 |
| 11,324,064 | B2* | 5/2022 | Cirik | H04W 76/19 |
| 11,343,735 | B2* | 5/2022 | Cirik | H04W 36/0072 |
| 11,419,173 | B2* | 8/2022 | Deenoo | H04W 72/23 |
| 11,444,676 | B2* | 9/2022 | Takeda | H04W 36/305 |
| 11,489,638 | B2* | 11/2022 | Manolakos | H04L 1/1642 |
| 11,523,290 | B2* | 12/2022 | Kim | H04W 76/27 |
| 11,569,889 | B2* | 1/2023 | Koskela | H04B 7/0695 |
| 11,641,232 | B2* | 5/2023 | Kang | H04W 56/001 370/329 |
| 11,659,416 | B2* | 5/2023 | Zhou | H04L 5/001 370/216 |
| 11,843,437 | B2* | 12/2023 | Chen | H04W 72/21 |
| 11,871,397 | B2* | 1/2024 | Cirik | H04W 72/1268 |
| 2020/0137801 | A1 | 4/2020 | Chen et al. | |
| 2020/0374960 | A1* | 11/2020 | Deenoo | H04W 74/0833 |
| 2022/0116094 | A1* | 4/2022 | Wang | H04B 7/0695 |
| 2022/0149918 | A1* | 5/2022 | Miao | H04B 7/0695 |
| 2022/0210675 | A1* | 6/2022 | Cui | H04W 36/0069 |
| 2023/0421231 | A1* | 12/2023 | Miao | H04B 7/088 |

FOREIGN PATENT DOCUMENTS

| | | |
|---|---|---|
| CN | 109391409 A | 2/2019 |
| WO | 2019/032882 A1 | 2/2019 |

OTHER PUBLICATIONS

International Search Report and Written Opinion of the International Searching Authority issued by the China National Intellectual Property Administration for corresponding International Patent Application No. PCT/CN2019/080216, mailed on Jun. 6, 2019, with an English translation.
Fujitsu, "Discussion on beam failure recovery", Agenda Item: 7.2.2.4, 3GPP TSG-RAN WG1 Meeting #91, R1-1719619, Reno, USA, Nov. 27-Dec. 1, 2017.
Extended European search report with the supplementary European search report and the European search opinion issued by the European Patent Office for corresponding European Patent Application No. 19922042.7-1205, mailed on Mar. 25, 2022.
Mediatek Inc., "Summary #2 on Remaining issues on Beam Failure Recovery", Agenda Item: 7.1.2.3, 3GPP TSG-RAN WG1 Meeting #94, R1-1809926, Gothenburg, Sweden, Aug. 20-24, 2018.
NTT Docomo, Inc., "Offline summary for PDCCH structure and search space part 2", Agenda Item: 7.1.3.1, 3GPP TSG-RAN WG1 Meeting #94bis, R1-1811926, Chengdu, China, Oct. 8-12, 2018.
Mediatek Inc., "Summary on Beam Failure Recovery", Agenda Item: 7.1.2.3, 3GPP TSG-RAN WG1 Meeting #95, R1-1814069, Spokane, US, Nov. 12-16, 2018.
NTT Docomo, Inc. "Offline summary for PDCCH structure and search space", Agenda Item: 7.1.3.1, 3GPP TSG-RAN WG1 Meeting #94bis, R1-1811820, Chengdu, China, Oct. 8-12, 2018.
Huawei et al., "Maintenance for beam management", Agenda Item: 7.1.2.3, 3GPP TSG-RAN WG1 Meeting #94bis, R1-1810100, Chengdu, China, Oct. 8-12, 2018.
The First Examination Report issued by the Indian Patent Office for corresponding Indian Patent Application No. 202137041912, dated Apr. 1, 2022, with an English translation.
First Notification of Office Action and Search Report issued by the China National Intellectual Property Administration for corresponding Chinese Patent Application No. 201980093876.6, mailed on Oct. 28, 2023, with an English translation.
Notice of Preliminary Rejection issued by the Korean Intellectual Property Office for corresponding Korean Patent Application No. 10-2021-7030789, mailed on May 17, 2024, with an English translation.

* cited by examiner

BEAM FAILURE RECOVERY METHOD AND DEVICE AND COMMUNICATION SYSTEM

CROSS-REFERENCE TO RELATED APPLICATION

This application is a continuation application of International Application PCT/CN2019/080216 filed on Mar. 28, 2019 and designated the U.S., the entire contents of which are incorporated herein by reference.

TECHNICAL FIELD

This disclosure relates to the field of communications, and in particular to a beam failure recovery method and device and a communication system.

BACKGROUND

Beam failure mainly refers to that in a high-frequency communication scenario, a communication link is subjected to physical conditions, such as weather, obstacles, changes in directions and angles, etc., so that transmission fails occur in the original beam direction.

Beam failure recovery (BFR) technique mainly refers to that in a case of beam failure, a new reliable beam direction is quickly positioned by using measurement results of beam power in different directions, so as to complete quick recovery of links.

A terminal equipment detects a reference signal (RS) associated with a downlink control channel (PDCCH) to determine whether a beam failure occurs; when it is determined that a beam failure occurs, the terminal equipment transmits a beam failure request to a network device, and monitors feedback of the network device for the beam failure request. After the terminal equipment receives via downlink control information (DCI) a beam failure recovery-related response (BFR response) transmitted by the network device, it switches an original beam direction for data reception to a candidate beam direction, thereby quickly recovering the failed link, and reducing latency and decrease in system throughput caused by the link failure.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in the existing beam failure recovery technique, a resource used in receiving a response related to beam failure recovery (BFR response) is identical to a control channel resource reset after the beam recovery is successful; however, when the two resources are not identical, there is no description of how a terminal equipment resets a downlink spatial direction.

It was further found by the inventors that the existing beam failure recovery technique may only be used for one carrier. In a scenario of multiple carrier components, at a certain moment, beam failure may possibly occur in only part of links on different carriers, in which case how the terminal equipment sets a downlink spatial direction after receiving the response related to beam failure recovery (BFR response) is not definitely specified.

In addition, in a scenario of multiple carrier components, a carrier component may not have a control channel resource used for receiving, and how to reset a spatial direction of a shared channel of the sub-carrier is not definitely specified currently.

Another scenario is that a terminal equipment may be configured with up to 32 carrier components, and performing beam failure measurement and recovery on each sub-carrier respectively may cause the terminal to interact with the network side too frequently, and there is no reliable solution to solve this problem currently.

In order to solve at least one of the above technical problems, embodiments of the present application provide a beam failure recovery method and device and a communication system. In the beam failure recovery method of an embodiment, a period of time after the terminal equipment receives the response related to beam failure recovery (BFR response), it switches the beam direction. Therefore, even when the control channel resource receiving the BFR response is different from the reset control channel resource, or in the scenario of multiple carriers, the terminal equipment may have enough time to switch the beam direction reliably, thereby improving system performance.

According to a first aspect of the embodiments of this disclosure, there is provided a beam failure recovery device, configured in a terminal equipment, the device including: a receiving unit configured to, after a period of time upon the terminal equipment receives a beam failure recovery (BFR) response and before activation or reconfiguration signaling, monitor and/or receive a downlink signal in a first cell of the terminal equipment according to an antenna quasi-co-located (QCL) parameter identical to a selected reference signal (q_new) or a reference signal (q_new) indicated by a higher layer.

According to a second aspect of the embodiments of this disclosure, there is provided a beam failure recovery device, applicable to a network device, the device including: a first indicating unit configured to transmit to a terminal equipment first signaling indicating to jointly perform beam failure recovery by two or more cells of the terminal equipment, or the device including: a second indicating unit configured to transmit to a terminal equipment a second signaling indicating a cell, and/or a bandwidth part (BWP), and or a control resource set (CORESET) monitoring and/or receiving a downlink signal.

According to a third aspect of the embodiments of this disclosure, there is provided a beam failure recovery method, applicable to a terminal equipment, the method including: after a period of time upon the terminal equipment receives a beam failure recovery (BFR) response and before activation or reconfiguration signaling, monitoring and/or receiving a downlink signal in a first cell of the terminal equipment according to an antenna quasi-co-located (QCL) parameter identical to a selected reference signal (q_new) or a reference signal (q_new) indicated by a higher layer.

According to a fourth aspect of the embodiments of this disclosure, there is provided a communication system, including a terminal equipment and a network device, the terminal equipment including the beam failure recovery device as describe in the first aspect of the embodiments.

An advantage of the embodiments of this disclosure exists in that after a period of time upon the terminal equipment receives a beam failure recovery (BFR) response, the terminal equipment switches the beam direction. Hence, the terminal equipment has enough time to perform switching in the beam direction, thereby improving the system performance.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

Figure 1:
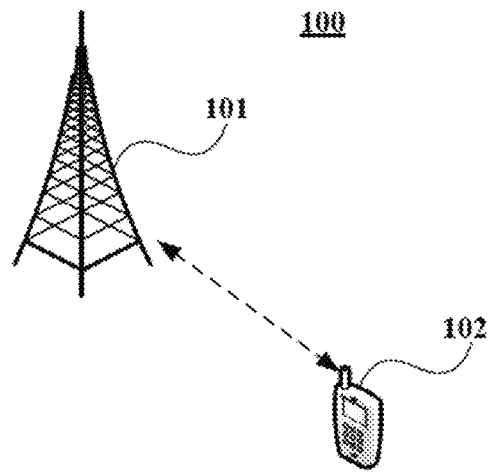
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

Wherein, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102 (for the sake of simplicity, description is given in FIG. 1 by taking one terminal equipment as an example).

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

The terminal equipment 102 may transmit data to the network device 101 in, for example, a grant-free transmission manner. The terminal equipment 102 may receive data transmitted by one or more terminal equipments 102, and feed back information to the terminal equipment 102, such as acknowledgement ACK/non-acknowledgement NACK, and the terminal equipment 102 may acknowledge termination of the transmission process according to the feedback information, or may further perform new data transmission, or may perform data retransmission.

Furthermore, before the terminal equipment 102 accesses to the network device 101, the network device 101 may transmit information related to system information to the terminal equipment 102, and the terminal equipment 102 detects the received information to achieve synchronization, and establishes connection with the network device 101.

Following description shall be given by taking that a network device in a communication system is a transmitter end and a terminal equipment is a receiver end as an example. However, this disclosure is not limited thereto, and the transmitter end and/or the receiver end may also be other devices. For example, this disclosure is applicable to not only signal transmission between a network device and a terminal equipment, but also signal transmission between two terminal equipments.

Embodiment 1

The embodiment of this disclosure provides a beam failure recovery (BFR) method, which may be carried out by a terminal equipment.

Figure 2:
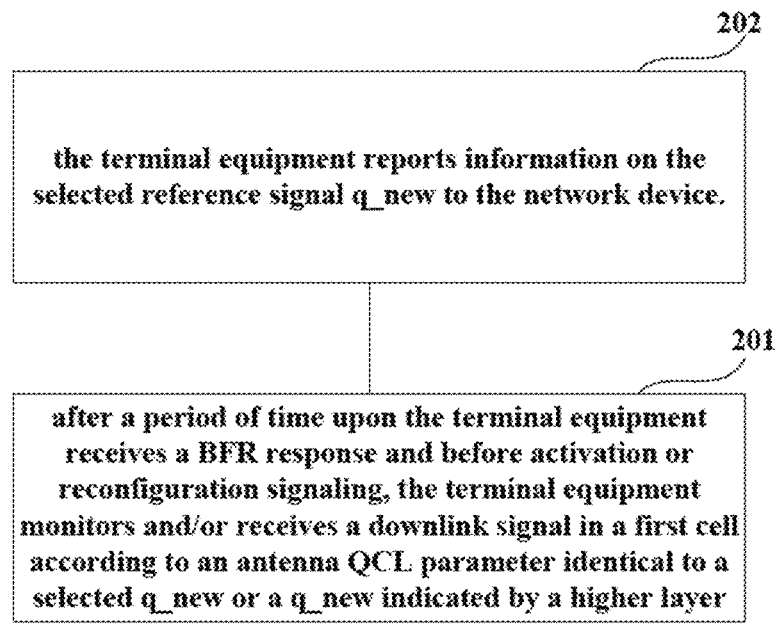
FIG. 2 is a schematic diagram of the beam failure recovery method of Embodiment 1 of this disclosure.

FIG. 2 is a schematic diagram of the beam failure recovery method of this embodiment. As shown in FIG. 2, the method includes:

step 201: after a period of time upon the terminal equipment receives a beam failure recovery (BFR) response and before activation or reconfiguration signaling, the terminal equipment monitors and/or receives a downlink signal in a first cell according to an antenna quasi-co-located (QCL) parameter identical to a selected reference signal (q_new) or a reference signal (q_new) indicated by a higher layer.

In this embodiment, the monitoring and/or receiving a downlink signal in a first cell by the terminal equipment according to an antenna quasi-co-located (QCL) parameter identical to a selected reference signal (q_new) or a reference signal (q_new) indicated by a higher layer refers to that the terminal equipment switches the beam direction to a beam direction corresponding to the reference signal q_new, thereby achieving switching of the beam direction.

According to this embodiment, the terminal equipment switches the beam direction a period of time after receiving the beam failure recovery related response (BFR response). Therefore, in a scenario of single carrier component, if a control channel resource receiving the beam failure recovery related response (BFR response) is different from a control channel resource reset by the terminal equipment after receiving the response, the terminal equipment may perform corresponding signal processing within the period of time, so that it has enough time to adjust the direction of beam, thereby reliably switching the beam direction; furthermore, in a scenario of multiple carrier components (such as at least two carrier components), the terminal equipment may have enough time to reliably switch the beam direction, thereby improving the system performance.

Figure 3A:
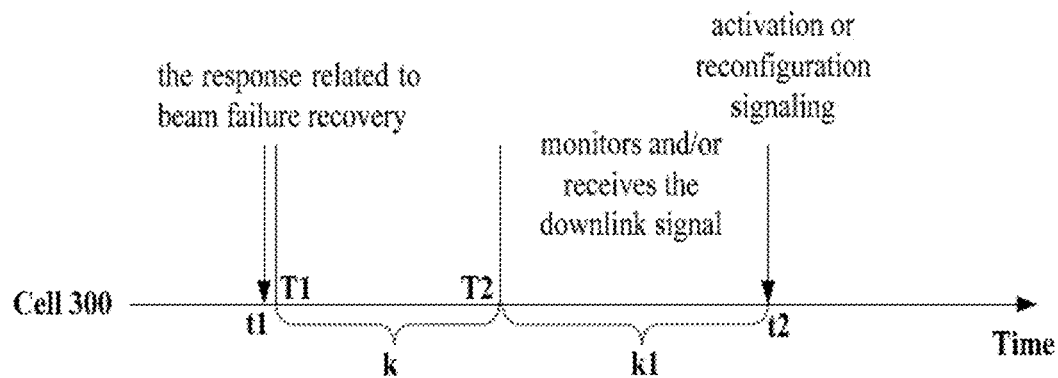
FIG. 3A is a schematic diagram of applying the beam failure recovery method of Embodiment 1 of this disclosure in a single-carrier scenario.

FIG. 3A is a schematic diagram of applying the beam failure recovery method of this embodiment in a scenario of single carrier component. As shown in FIG. 3A, the terminal equipment receives the response related to beam failure recovery (BFR response) at time t1, and in a period of time kl after a period of time k and before a time t2 when activation or reconfiguration signaling is received, the terminal equipment adjusts the antenna quasi-co-located (QCL) parameter to be identical to the selected or high-layer-indicated reference signal q_new, thereby switching the beam direction, and monitors and/or receives the downlink signal in the switched beam direction.

As shown in FIG. 3A, in a case where downlink control information (DCI) used in detecting whether a beam failure occurs is different from downlink control information (DCI) used in receiving the beam failure recovery related response (BFR response), the terminal equipment may perform corresponding signal processing in this period of time k, so that it has enough time to adjust the beam direction. Therefore, in a period of time kl, it may reliably monitor and/or receive the downlink signal in the switched beam direction. The signal processing performed by the terminal equipment in the period of time k includes, for example, decoding the received BFR response, and then preparing for adjusting corresponding downlink reception of a beam according to the reference signal q_new. Alternatively, it may be said that the period of time k is a time needed by the terminal equipment after receiving the BFR response in applying the QCL information to which q_new corresponds.

As shown in FIG. 3A, the cell of the terminal equipment receiving the response related to beam failure recovery (BFR response) is the same cell as the cell monitoring and/or receiving the downlink signal, such as a cell 300.

Figure 3B:
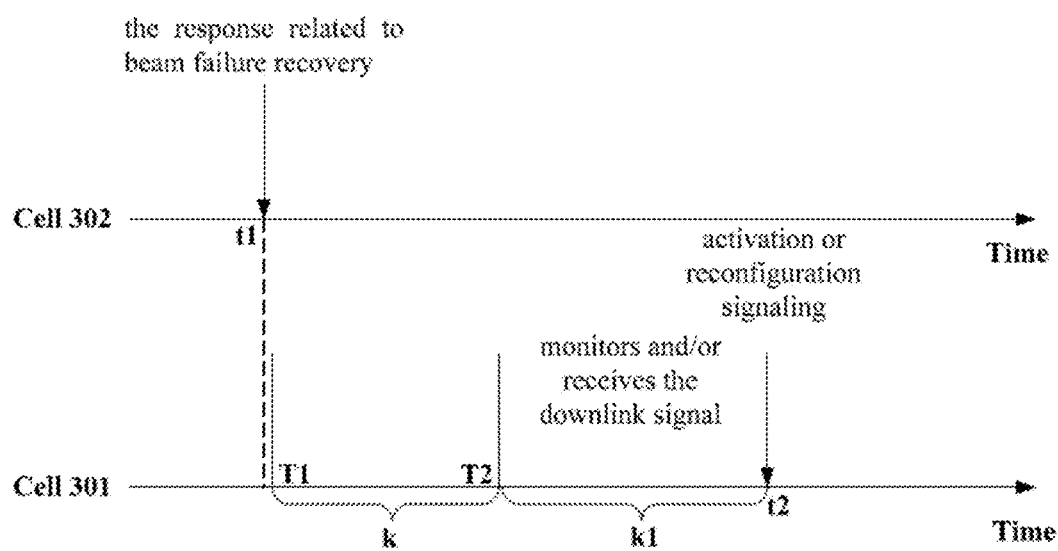
FIG. 3B is a schematic diagram of applying the beam failure recovery method of Embodiment 1 of this disclosure in a multi-carrier scenario.

FIG. 3B is a schematic diagram of applying the beam failure recovery method of this embodiment in a multi-carrier scenario. As shown in FIG. 3B, the terminal equipment receives a response related to beam failure recovery (BFR response) at time t1, in a period of time k1 after the period of time k and before receiving activation or reconfiguration signaling at time t2, the terminal equipment adjusts the antenna quasi-co-located (QCL) parameter to be identical to the selected or high-layer-indicated reference signal q_new, thereby switching the beam direction, and monitors and/or receives the downlink signal in the switched beam direction.

As shown in FIG. 3B, the terminal equipment may receive the response related to beam failure recovery (BFR response) in a second cell 302, and monitor and/or receive the downlink signal in the first cell 301. The second cell 302 and the first cell 301 may be different. For example, the second cell 302 is a primary cell PCell or a secondary cell SCell #0, and the first cell 301 is a secondary cell SCell #1.

As shown in FIG. 3B, when the first cell is different from the second cell, the terminal equipment may perform corresponding signal processing in the period of time k, so that it has enough time to adjust the beam direction. Therefore, it may reliably monitor and/or receive the downlink signal in the switched beam direction in the period of time k1. The signal processing performed by the terminal equipment in the period of time k includes, for example, decoding the received BFR response, and then preparing for adjusting corresponding downlink reception of a beam according to the reference signal q_new. Alternatively, it may be said that the period of time k is a time needed by the terminal equipment after receiving the BFR response in applying the QCL information to which q_new corresponds.

In this embodiment, the first cell 301 and the second cell 302 belong to the same cell group, and the cell group may be, for example, a master cell group (MCG), or a secondary cell group (SCG).

In this embodiment, the downlink signal monitored or received by the terminal equipment includes at least one of the following signals: a physical downlink control channel (PDCCH), a physical downlink shared channel (PDSCH), a channel state information reference signal (CSI-RS), and a synchronization signal block (SSB). However, this embodiment is not limited thereto, and the downlink signal may also be other signals.

In the following description of this embodiment, the beam failure recovery method of this embodiment in a multi-carrier scenario shall be described by taking that the downlink signal is a physical downlink control channel (PDCCH) and/or a physical downlink shared channel (PDSCH) as an example. In addition, for description of the beam failure recovery method when the downlink signal is a channel state information reference signal (CSI-RS) or a synchronization signal block (SSB), reference may be made to corresponding description of the beam failure recovery method to which the physical downlink control channel (PDCCH) or the physical downlink shared channel (PDSCH) corresponds.

In this embodiment, only when there is an occasion to monitor the physical downlink control channel (PDCCH) in the first cell may the terminal equipment monitor the physical downlink control channel (PDCCH) in the first cell. For example, when there is an occasion to monitor the physical downlink control channel (PDCCH) in the first cell, the terminal equipment monitors the physical downlink control channel (PDCCH) in the first cell, or monitors the physical downlink control channel (PDCCH) and receives the physical downlink shared channel (PDSCH) in the first cell.

In addition, if there is no occasion (opportunity) to monitor the physical downlink control channel (PDCCH) in the first cell, the terminal equipment does not monitor the physical downlink control channel (PDCCH) in the first cell.

In this embodiment, when the terminal equipment monitors the physical downlink control channel (PDCCH) in the first cell, a control resource set (CORESET) or a search space to which the PDCCH corresponds may satisfy at least one of the following conditions:
(1) all control resource sets (CORESETs) or search spaces on an active bandwidth part (BWP) in the first cell 301 to which the physical downlink control channel (PDCCH) corresponds;
(2) that the control resource sets (CORESETs) or search spaces to which the physical downlink control channel (PDCCH) corresponds are default control resource sets (CORESETs) or search spaces, the default control resource set (CORESETs) or search space may be, for example, the control resource set (CORESETs) or search space with the minimum identifier (ID) or the maximum identifier (ID); and
(3) that the control resource sets (CORESETs) or search spaces to which the physical downlink control channel (PDCCH) corresponds are control resource sets (CORESETs) or search spaces indicated by radio resource control (RRC) signaling.

In this embodiment, the physical downlink shared channel (PDSCH) received by the terminal equipment in the first cell may be at least one of the following:
(1) a physical downlink shared channel (PDSCH) in the first cell, the physical downlink shared channel (PDSCH) may be predetermined, such as all physical downlink shared channels (PDSCHs) in the first cell; or
(2) in a case where there exists an occasion for monitoring the physical downlink control channel (PDCCH) in the first cell, a physical downlink shared channel (PDSCH) scheduled by the monitored physical downlink control channel (PDCCH); or
(3) a physical downlink shared channel (PDSCH) scheduled by a physical downlink control channel (PDCCH) receiving the beam failure recovery (BFR) response.

In this embodiment, a format of the response related to beam failure recovery (BFR response) may be, for example, a downlink control signaling (DCI) format scrambled by a cell radio network temporary identifier (C-RNTI), or a downlink control signaling (DCI) format scrambled by a modulation and coding scheme cell radio network temporary identifier (MCS-C-RNTI) cyclic redundancy check.

In this embodiment, the beam failure recovery (BFR) response is detected in a search space used for a beam failure recovery random access response (BFR RAR). For example, the beam failure recovery (BFR) response is the first physical downlink control channel (PDCCH) in the search space.

In this embodiment, the search space may be configured by radio resource control (RRC) signaling, and a name of the radio resource control (RRC) signaling may be, for example, a recovery search space identifier (recovery search space ID). In addition, the search space may be a search space of the first cell 301, such as a search space of the second secondary cell SCell #1; and the search space may also be a search space of the second cell 302, such as a search space of the primary cell PCell or a search space of the first secondary cell SCell #0.

In this embodiment, a length of the period of time k may be expressed as an absolute time, such as 3 milliseconds (ms), or the number of slots or symbols related to a subcarrier spacing (SCS), for example, for 15 kHz and 30 kHz, k=14 symbols, and for 60 kHz and 120 kHz, k=28 symbols. For another example, $$k = \frac{\mu_{cell}}{\mu_{15\,kHz}} * m$$

symbols; where, $\mu_{cell}$ refers to a subcarrier spacing to which the downlink signal corresponds, $\mu_{15\,kHz}$ refers to a subcarrier spacing to which 15 kHz corresponds, and m refers to a normalized length of k, which may be a natural number, for example, m=28. Another example is that $$k = \left\lceil \frac{\mu_{DCI}}{\mu_{DL}} * m \right\rceil$$

symbols; where, $\mu_{DCI}$ refers to a subcarrier spacing to which the BFR response corresponds, $\mu_{DL}$ refers to a subcarrier spacing to which the downlink signal corresponds, and m refers to a normalized length of k, m may be a natural number, for example, m=28.

In this embodiment, the subcarrier spacing (SCS) may include a subcarrier spacing of the first cell 301, or a subcarrier spacing of a cell where the response related to beam failure recovery (BFR response) is received, such as a subcarrier spacing of the second cell 302.

In this embodiment, the length of the period of time k may be related to a capability of the terminal equipment. Levels of the capability of the terminal equipment are different, and lengths of the time k (on corresponding subcarriers) corresponding thereto are also different. For example, the higher the level of capability of the terminal equipment, the faster the processing speed of the terminal equipment, and the shorter the corresponding length of the time k.

In this embodiment, a starting point T1 of the period of time k may be of any one of the following cases:
(1) a slot receiving the beam failure recovery (BFR) response;
(2) the last symbol of the beam failure recovery (BFR) response;
(3) the last symbol in a control resource set receiving the beam failure recovery (BFR) response.

In this embodiment, an ending point T2 of the period of time k may be of any one of the following cases:
(1) a slot used for receiving the downlink signal. If the downlink signal occupies only one slot in the time domain, the ending point of the period of time k may be a slot where the downlink signal is located, and if the downlink signal occupies multiple slots in the time domain (for example, the downlink signal is a PDSCH, and a value of RRC signaling pdsch-AggregationFactor to which the PDSCH corresponds is greater than 1), the ending point of the period of time k may be the first one of the multiple slots;
(2) the first symbol of the downlink signal;
(3) the first symbol in a control resource set (CORESET) or a search space used for monitoring the downlink signal, such as the first symbol in a control resource set (CORESET) or a search space used for monitoring a PDCCH.

The control resource set (CORESET) or search space (search space) used for monitoring the PDCCH described in (3) above satisfies at least one of the following conditions:
(1) all control resource sets (CORESETs) or search spaces to which the physical downlink control channel (PDCCH) corresponds and on an active bandwidth part (BWP) in the first cell 301;
(2) that the control resource sets (CORESETs) or search spaces to which the physical downlink control channel (PDCCH) corresponds are default control resource sets (CORESETs) or search spaces, the default control resource sets (CORESETs) or search spaces are, for example, control resource sets (CORESETs) or search spaces with the minimum identifier (ID) or the maximum identifier (ID); and
(3) that the control resource sets (CORESETs) or search spaces to which the physical downlink control channel (PDCCH) corresponds are control resource sets (CORESETs) or search spaces indicated by radio resource control (RRC) signaling.

In this embodiment, the activation or reconfiguration signaling received at the time t2 may include: activation or reconfiguration signaling for the first cell 301; or activation or reconfiguration signaling for the second cell 302 associated with the first cell 301, the second cell 302 may be a secondary cell SCell #0, and the first cell 301 and the second cell 302 perform a beam failure recovery (BFR) procedure jointly, or perform measurement of beam failure recovery jointly; or activation or reconfiguration signaling for a primary cell PCell of the terminal equipment, the primary cell PCell and the first cell 301 perform a beam failure recovery (BFR) procedure jointly, or perform measurement of beam failure recovery.

In this embodiment, the activation or reconfiguration signaling may include: MAC-CE signaling for activating a Transmission Configuration Indication (TCI) state of a control resource set (CORESET) to which the downlink signal corresponds, the downlink signal being, for example, a PDCCH; or MAC-CE signaling for activating a TCI state set to which the downlink signal corresponds, the downlink signal being, for example, a PDSCH; or radio resource control (RRC) signaling for reconfiguring a TCI state set of a control resource set (CORESET) to which the downlink signal corresponds, the downlink signal being, for example, a PDCCH, and the radio resource control (RRC) signaling being, for example, tci-StatesPDCCH-ToAddList, or tci-StatesPDCCH-ToReleaseList; or radio resource control (RRC) signaling for reconfiguring a TCI state set to which the downlink signal corresponds, the downlink signal being, for example, a PDSCH, and the radio resource control (RRC) signaling being, for example, tci-StatesToAddModList, or tci-StatesToReleaseList.

In this embodiment, the first cell 301 may include: a cell to which cell information reported by the terminal equipment to the network device corresponds; reporting of the cell information may occur after the beam failure, for example, the terminal equipment may report the index (ID) of the first cell 301, and beam failure is detected in the first cell 301; or a cell associated with the second cell 302 to which cell information reported by the terminal equipment to the network device corresponds, for example, the terminal equipment may report the index (ID) of the second cell 302, the second cell 302 is associated with the first cell 301, and beam failure is detected in the second cell 302; or a cell associated with the second cell 302 indicated by a higher layer of the terminal equipment, such as a secondary cell SCell #1 with which a secondary cell SCell #0 with a beam failure indicated by a media access control (MAC) layer of the terminal equipment is associated; or a cell associated with the second cell 302 receiving the beam failure recovery (BFR) response.

In this embodiment, the association between the second cell 302 and the first cell 301 may be configured by radio resource control (RRC) signaling. For example, the radio resource control (RRC) signaling configures that the secondary cell SCell #1 taken as the first cell 301 and the secondary cell SCell #0 or the primary cell PCell taken as the second cell 302 perform beam failure recovery (BFR) jointly.

In this embodiment, the reference signal q_new may be a selected reference signal or a reference signal indicated by a higher layer. The selected reference signal q_new may be a reference signal selected by the terminal equipment from a list containing a set of reference signals (RS) used for determining beam failure recovery (BFR) candidate beams, and the reference signal indicated by the higher layer may be a reference signal indicated by the higher layer (such as an MAC layer) of the terminal equipment to a physical layer most recently (the last time).

In this embodiment, as shown in FIG. 2, the beam failure recovery method further includes: step 202: the terminal equipment reports information on the selected reference signal q_new to the network device.

The information on the selected reference signal q_new may be, for example, an identifier (ID) of the reference signal q_new.

In step 202, the terminal equipment may report the information on the selected reference signal q_new to the network device via a media access control control element (MAC-CE) message, a physical uplink control channel (PUCCH), or a physical random access channel (PRACH). The media access control control element (MAC-CE) message may be transmitted via a physical uplink shared channel (PUSCH), and the information on q_new may also be transferred by using a time-frequency resource position to which a PUCCH corresponds or a resource ID of the PUCCH; and furthermore, different PRACH resources may be associated with different candidate RSs used for the BFR, and the network device may learn a corresponding q_new according to an RS resource to which a resource of a transmitted PRACH corresponds.

In one implementation of this disclosure, for example, step 202 may be executed before step 201.

In this embodiment, the first cell 301 may not be configured with a random access response (RAR) search space used for receiving the beam failure recovery (BFR) response, in which case the terminal equipment may perform beam failure recovery in the mode shown in FIG. 3B, and receive the beam failure recovery (BFR) response at the second cell 302.

Furthermore, in this embodiment, the first cell 301 may be configured with a random access response (RAR) search space used for receiving the beam failure recovery (BFR) response, in which case, the terminal equipment may perform beam failure recovery in the mode shown in FIG. 3A, that is, it receives the response related to the beam failure recovery (BFR response) in the same cell, monitors and/or receives the downlink signal, and monitors and/or receives the downlink signal in the period of time kl, the period of time kl is after the period time k which is after the terminal equipment receives the response related to the beam failure recovery (BFR response) and before t2 when the activation or reconfiguration signaling is received;

or, the terminal equipment may receive the beam failure recovery (BFR response) in the same cell and monitor and/or receive the downlink signal, and the terminal equipment monitors and/or receives the downlink signal in a period of time after the terminal equipment receives the response related to the beam failure recovery (BFR response) and before the period of time t2 when the activation or reconfiguration signaling is received, that is, the search space used for monitoring the PDCCH is identical to the search space used for receiving the BFR response, hence, the period of time k may not be needed.

According to this embodiment, after a period of time upon the terminal equipment receives a beam failure recovery (BFR) response, the terminal equipment switches the beam direction. Therefore, in a scenario of single carrier component, if a control channel resource receiving the beam failure recovery related response (BFR response) is different from a control channel resource reset by the terminal equipment after receiving the response, the terminal equipment may perform corresponding signal processing within the period of time, so that it has enough time to adjust the direction of beam, thereby reliably switching the beam direction; furthermore, in a scenario of multiple carrier components (such as at least two carrier components), the terminal equipment may have enough time to reliably switch the beam direction, thereby improving the system performance.

Embodiment 2

The embodiment of this disclosure provides a beam failure recovery device. As a principle of the device for solving problems is similar to that of the method of Embodiment 1, reference may be made to the implementation of the method of Embodiment 1 for implementation of this device, with identical parts being not going to be described herein any further.

Figure 4:
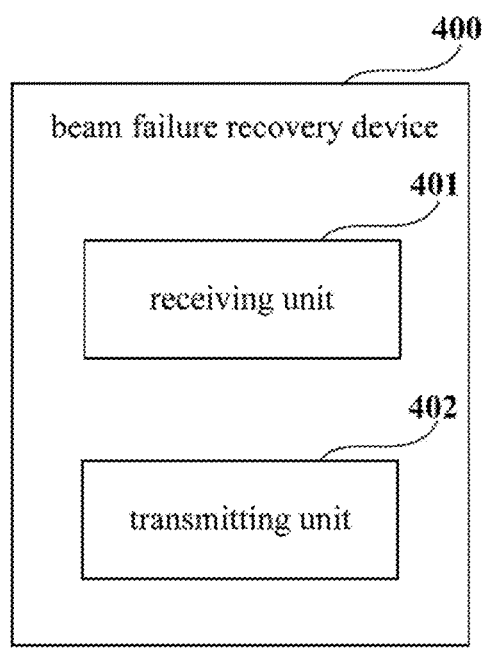
FIG. 4 is a schematic diagram of the beam failure recovery device of Embodiment 2 of this disclosure.

FIG. 4 is a schematic diagram of the beam failure recovery device of Embodiment 2. As shown in FIG. 4, a beam failure recovery device 400 includes a receiving unit 401.

In this embodiment, after a period of time k upon a terminal equipment receives a beam failure recovery (BFR) response and before activation or reconfiguration signaling, the receiving unit 401 monitors and/or receives a downlink signal in a first cell of the terminal equipment according to an antenna quasi-co-located (QCL) parameter identical to a selected reference signal q_new or a reference signal q_new indicated by a higher layer.

In this embodiment, the downlink signal includes at least one of the following:

a physical downlink control channel (PDCCH), a physical downlink shared channel (PDSCH), a channel state information reference signal (CSI-RS), and a synchronization signal block (SSB).

In this embodiment, in a case where there exists an occasion for monitoring the physical downlink control channel (PDCCH) in the first cell, the receiving unit 401 monitors the physical downlink control channel (PDCCH) in the first cell.

In this embodiment, in the case where the terminal equipment monitors the physical downlink control channel (PDCCH) in the first cell, a control resource set (CORESET)

or a search space to which the PDCCH corresponds may satisfy at least one of the following conditions:

(1) all control resource sets (CORESETs) or search spaces on an active bandwidth part (BWP) in the first cell 301 to which the physical downlink control channel (PDCCH) corresponds;

(2) that the control resource sets (CORESETs) or search spaces to which the physical downlink control channel (PDCCH) corresponds are default control resource sets (CORESETs) or search spaces, the default control resource sets (CORESETs) or search spaces are, for example, control resource sets (CORESETs) or search spaces with a minimum identifier (ID) or a maximum identifier (ID); and (3) that the control resource sets (CORESETs) or search spaces to which the physical downlink control channel (PDCCH) corresponds are control resource sets (CORESETs) or search spaces indicated via radio resource control (RRC) signaling.

In this embodiment, the physical downlink shared channel (PDSCH) includes:

a physical downlink shared channel (PDSCH) in the first cell; or in a case where there exists an occasion for monitoring the physical downlink control channel (PDCCH) in the first cell, a physical downlink shared channel (PDSCH) scheduled by the monitored physical downlink control channel (PDCCH); or a physical downlink shared channel (PDSCH) scheduled by a physical downlink control channel (PDCCH) receiving the beam failure recovery (BFR) response.

In this embodiment, a format of the beam failure recovery (BFR) response may be, for example, a downlink control signaling (DCI) format scrambled by a cell radio network temporary identifier (C-RNTI) or modulation and coding scheme cell radio network temporary identifier (MCS-C-RNTI) cyclic redundancy check.

In this embodiment, the beam failure recovery (BFR) response is detected in a search space of a beam failure recovery random access response (BFR RAR), the beam failure recovery (BFR) response is a first physical downlink control channel (PDCCH) in the search space.

In this embodiment, the period of time k may be expressed as: an absolute time; or the number of slots or symbols associated with a subcarrier spacing;

the subcarrier spacing includes: a subcarrier spacing of the first cell; or, a subcarrier spacing of a cell in which the beam failure recovery (BFR) response is received.

In this embodiment, a length of the period of time k is related to a capability of the terminal equipment, the higher the capability of the terminal equipment, the shorter the period of time k.

In this embodiment, a starting point T1 of the period of time is: a slot of the terminal equipment receiving the beam failure recovery (BFR) response; or a last symbol of the beam failure recovery (BFR) response; or a last symbol of the terminal equipment in a control resource set (CORESET) receiving the beam failure recovery (BFR) response.

In this embodiment, an ending point T2 of the period of time is: a slot used for receiving the downlink signal; or a first symbol in a control resource set (CORESET) or a search space used for monitoring the downlink signal; or a first symbol of the downlink signal.

When the downlink signal is a physical downlink control channel (PDCCH), the control resource set (CORESET) or the search space used for monitoring the downlink signal satisfies at least one of the following conditions:

all control resource sets (CORESETs) or search spaces on an active bandwidth part (BWP) in the first cell 301 to which the physical downlink control channel (PDCCH) corresponds;

that the control resource sets (CORESETs) or search spaces to which the physical downlink control channel (PDCCH) corresponds are default control resource sets (CORESETs) or search spaces; and that the control resource sets (CORESETs) or search spaces to which the physical downlink control channel (PDCCH) corresponds are control resource sets (CORESETs) or search spaces indicated via radio resource control (RRC) signaling.

In this embodiment, the activation or reconfiguration signaling may be: activation or reconfiguration signaling for the first cell; or activation or reconfiguration signaling for a second cell associated with the first cell; or activation or reconfiguration signaling for a primary cell of the terminal equipment.

In this embodiment, the activation or reconfiguration signaling may be: MAC-CE signaling for activating a TCI state of a control resource set (CORESET) to which the downlink signal corresponds; or MAC-CE signaling for activating a TCI state set to which the downlink signal corresponds; or radio resource control (RRC) signaling for reconfiguring a TCI state set of a control resource set (CORESET) to which the downlink signal corresponds; or radio resource control (RRC) signaling for reconfiguring a TCI state set to which the downlink signal corresponds.

In this embodiment, the first cell includes: a cell to which cell information reported by the terminal equipment to the network device corresponds; or a cell associated with a cell to which cell information reported by the terminal equipment to the network device corresponds; or a cell indicated by a higher layer of the terminal equipment; or a cell associated with a cell indicated by a higher layer of the terminal equipment; or a cell associated with a cell receiving the beam failure recovery (BFR) response.

In this embodiment, an association relationship between the cell to which cell information reported by the terminal equipment to the network device corresponds and the cell associated with the cell is configured by radio resource control (RRC) signaling.

In this embodiment, an association relationship between the cell indicated by the higher layer of the terminal equipment and the cell associated with the cell is configured by radio resource control (RRC) signaling.

In this embodiment, the selected reference signal (q_new) is selected from a list containing a set of reference signals (RS) used for determining beam failure recovery (BFR) candidate beams. And the reference signal (such as the MAC layer of the terminal equipment) is a reference signal (q_new) indicated by the higher layer most recently.

As shown in FIG. 4, the device 400 may further include a transmitting unit 402.

The transmitting unit 402 reports information on the selected reference signal (q_new) to the network device.

For example, the transmitting unit 402 reports the information on the selected reference signal q_new to the network device via an MAC-CE message, a physical uplink control channel (PUCCH), or a physical random access channel (PRACH).

The information on the selected reference signal q_new may be, for example, an identifier of the selected reference signal q_new.

In this embodiment, the first cell may not be configured with an RAR search space used for receiving the beam failure recovery (BFR) response.

Furthermore, in this embodiment, the first cell may be configured with an RAR search space used for receiving the beam failure recovery (BFR) response.

According to this embodiment, after a period of time upon the terminal equipment receives a beam failure recovery (BFR) response, the terminal equipment switches the beam direction. Therefore, the terminal equipment has enough time to switch the direction of beam, thereby improving the system performance.

Embodiment 3

The embodiment of this disclosure provides a terminal equipment. As a principle of the equipment for solving problems is similar to that of the method of Embodiment 1, reference may be made to the implementation of the method of Embodiment 1 for implementation of this equipment, with identical parts being not going to be described herein any further.

Figure 5:
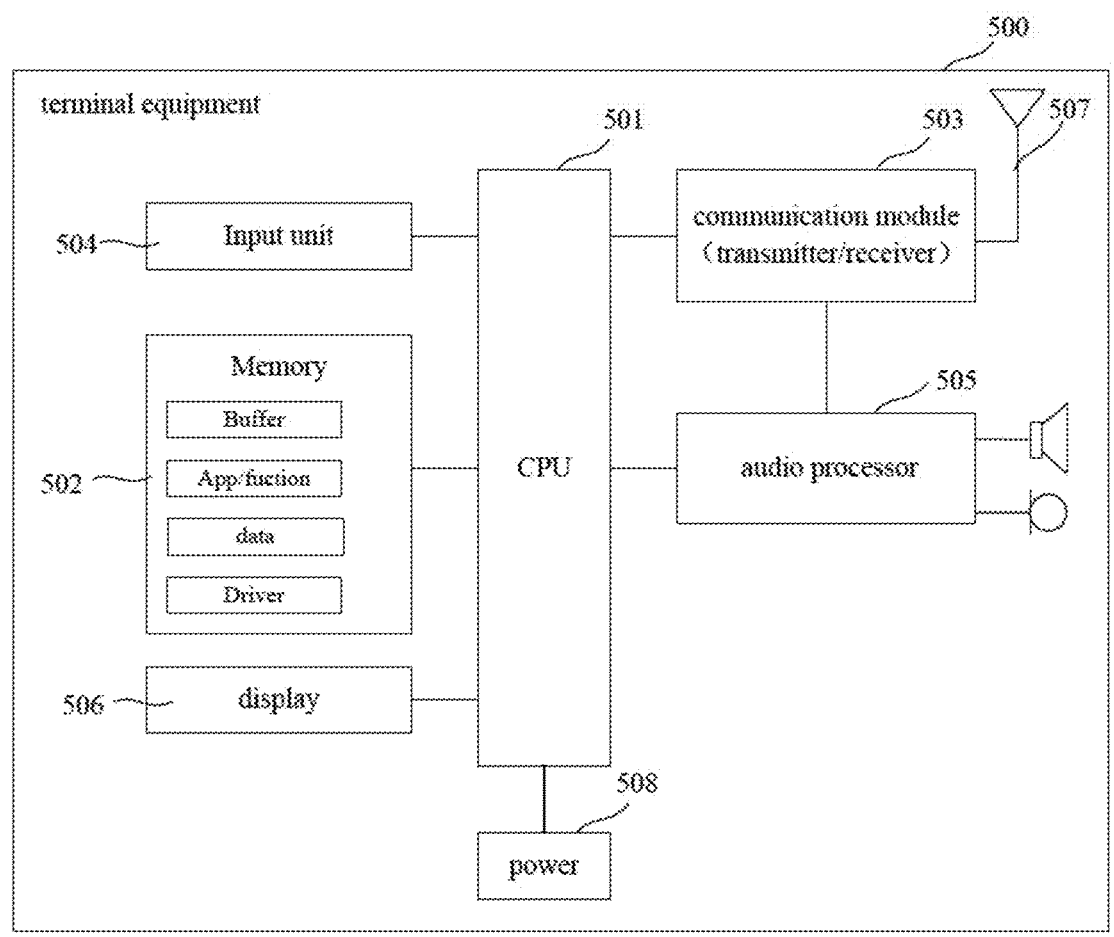
FIG. 5 is a schematic diagram of the terminal equipment of Embodiment 3 of this disclosure.

FIG. 5 is a schematic diagram of a structure of the terminal equipment of the embodiment of this disclosure. As shown in FIG. 5, a terminal equipment 500 may include a central processing unit (CPU) 501 and a memory 502, the memory 502 being coupled to the central processing unit 501. The memory 502 may store various data, and furthermore, it may store a program for data processing, and execute the program under control of the central processing unit 501, so as to indicate to the terminal equipment according to the received signaling.

In one implementation, the functions of the device 400 described in Embodiment 2 may be integrated into the central processing unit 501 of the terminal equipment 500. Wherein, the central processing unit 501 may be configured to carry out the beam failure recovery method in Embodiment 1.

For example, the central processing unit 501 may be configured to perform control so that the terminal equipment 500 carries out the method in Embodiment 1.

Furthermore, reference may be made to Embodiment 1 for other configurations of the central processing unit 501, which shall not be described herein any further.

In another implementation, the device 400 and the central processing unit 501 may be configured separately; for example, the device 400 may be configured as a chip connected to the central processing unit 501, such as the unit shown in FIG. 5, and the functions of the device 400 are executed under control of the central processing unit 501.

Furthermore, as shown in FIG. 5, the terminal equipment 500 may further include a communication module 503, an input unit 504, a display 506, an audio processor 505, an antenna 507, and a power supply 508, etc.

According to this embodiment, the terminal equipment may have enough time to switch the direction of beam, thereby improving the system performance.

Embodiment 4

The embodiment of this disclosure provides a beam failure recovery method, which may be carried out by a network device.

Figure 6:
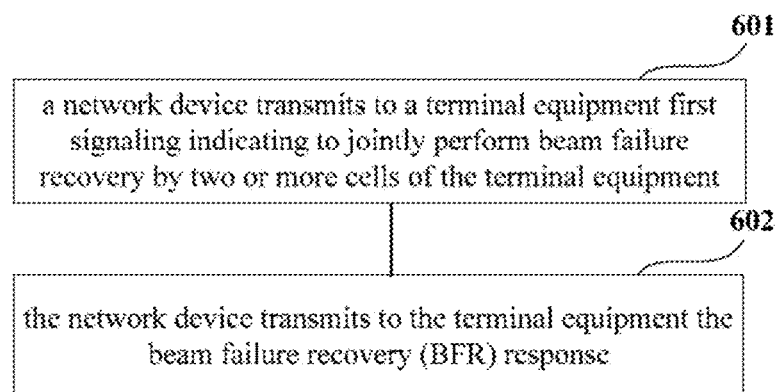
FIG. 6 is a schematic diagram of the beam failure recovery method of Embodiment 4 of this disclosure.

FIG. 6 is a schematic diagram of the beam failure recovery method of this embodiment. As shown in FIG. 6, the method includes:

step 601: a network device transmits to a terminal equipment first signaling indicating to jointly perform beam failure recovery by two or more cells of the terminal equipment.

The first signaling in step 601 may be, for example, RRC signaling, etc.

According to this embodiment, the network device may associate two or more carriers via the first signaling, so that their beam failure recovery (BFR) procedures are associated. As a result, these carriers (with similar spatial characteristics) may use identical reference signals (RSs) for BFR measurement. When a beam failure occurs and the terminal equipment recovers from the beam failure (after the reception of BFR response), the terminal equipment may simultaneously reset the downlink signal reception spatial directions of the carriers indicated the first signaling. This avoids a problem of too frequent interaction between the terminal equipment and the network device that may be caused when beam failure measurement and recovery are performed on each subcarrier respectively.

In this embodiment, as shown in FIG. 6, the method may further include:

step 602: the network device transmits to the terminal equipment the beam failure recovery (BFR) response.

In this embodiment, when the terminal equipment determines the beam failure and transmits a beam failure request to the network device, the network device may transmit the beam failure recovery-related response (BFR response) to the terminal equipment.

After the terminal equipment receives the beam failure recovery-related response (BFR response) for a period of time k and before the activation or reconfiguration signaling, the terminal equipment may monitor and/or receive a downlink signal according to an antenna quasi-co-located (QCL) parameter identical to a selected reference signal (q_new) or a reference signal (q_new) indicated by a higher layer. Reference may be made to Embodiment 1 for detailed description of monitoring and/or receiving the downlink signal by the terminal equipment.

Embodiment 5

The embodiment of this disclosure provides a beam failure recovery method, which may be carried out by a network device.

Figure 7:
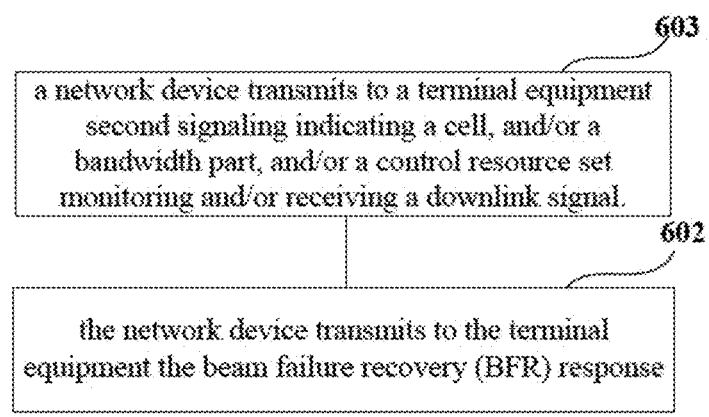
FIG. 7 is a schematic diagram of the beam failure recovery method of Embodiment 5 of this disclosure.

FIG. 7 is a schematic diagram of the beam failure recovery method of this embodiment. As shown in FIG. 7, the method includes:

step 603: a network device transmits to a terminal equipment second signaling indicating a cell, and/or a bandwidth part (BWP), and/or a control resource set (CORESET) monitoring and/or receiving a downlink signal.

The second signaling in step 603 may be, for example, RRC signaling, etc.

The terminal equipment may receive the downlink signal according to indication of the second signaling.

The second signaling includes mapping relationships between cells, and/or BWPs, and/or control resource sets (CORESETs) or search spaces. The terminal equipment may receive the downlink signal on a corresponding CORESET or search space according to the mapping relationships with reference to cell information indicated by high-layer signaling and an active BWP on the cell. For example, the second signaling includes the following mapping relationships:

mapping relationship 1: cell #1→BWP #1→CORESET #2;

mapping relationship 2: cell #1→BWP #2→CORESET #4;

mapping relationship 3: cell #3→BWP #1→CORESET #1.

Based on the mapping relationship 1, when the terminal equipment receives an indication on a cell (with a cell ID=1) of the higher layer and the active BWP of the cell is BWP #1, the terminal equipment receives the PDCCH in CORESET #2 of BWP #1 of cell #1, i.e. receiving the PDCCH according to the QCL parameter of q_new.

Based on the mapping relationship 2, when the terminal equipment receives an indication on a cell (with a cell ID=1) of the higher layer and the active BWP of the cell is BWP #2, the terminal equipment receives the PDCCH in CORESET #4 of BWP #2 of cell #1, i.e. receiving the PDCCH according to the QCL parameter of q_new.

Based on the above mapping relationship 3, when the terminal equipment receives an indication on a cell (with a cell ID=3) of the higher layer and the active BWP of the cell is BWP #1, the terminal equipment receives the PDCCH in CORESET #1 of BWP #1 of cell #3, i.e. receiving the PDCCH according to the QCL parameter of q_new.

In this embodiment, as shown in FIG. 7, the method may further include:

step 602: the network device transmits to the terminal equipment the beam failure recovery (BFR) response.

Reference may be made to the description of Embodiment 4 for description of step 602.

In one implementation of this embodiment, for example, step 603 may be executed before step 602.

Embodiment 6

The embodiment of this disclosure provides a beam failure recovery device. As a principle of the device for solving problems is similar to that of the method of Embodiment 4, reference may be made to the implementation of the method of Embodiment 4 for implementation of this device, with identical parts being not going to be described herein any further.

Figure 8:
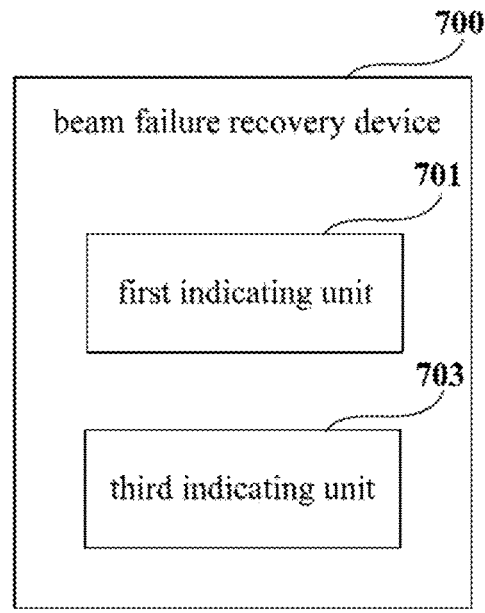
FIG. 8 is a schematic diagram of the beam failure recovery device of Embodiment 6 of this disclosure.

FIG. 8 is a schematic diagram of the beam failure recovery device of Embodiment 6. As shown in FIG. 8, a beam failure recovery device 700 includes a first indicating unit 701.

The first indicating unit 701 transmits to a terminal equipment first signaling indicating to jointly perform beam failure recovery by two or more cells of the terminal equipment.

Hence, multiple carriers with similar spatial characteristics may use identical reference signals (RSs) for BFR measurement. When a beam failure occurs and the terminal equipment recovers from the beam failure (after the reception of BFR response), the terminal equipment may simultaneously reset the downlink signal reception spatial directions of the carriers indicated. This avoids a problem of too frequent interaction between the terminal equipment and the network device that may be caused when beam failure measurement and recovery are performed on each subcarrier respectively.

As shown in FIG. 8, the device 700 may further include:
a third indicating unit 703 configured to transmit a beam failure recovery (BFR) response to the terminal equipment.

In this embodiment, when the terminal equipment determines the beam failure and transmits a beam failure request to the network device, the network device may transmit the beam failure recovery-related response (BFR response) to the terminal equipment.

Embodiment 7

The embodiment of this disclosure provides a beam failure recovery device. As a principle of the device for solving problems is similar to that of the method of Embodiment 5, reference may be made to the implementation of the method of Embodiment 5 for implementation of this device, with identical parts being not going to be described herein any further.

Figure 9:
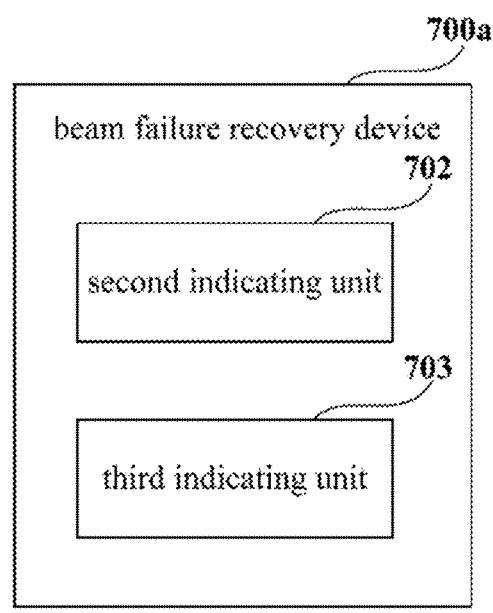
FIG. 9 is a schematic diagram of the beam failure recovery device of Embodiment 7 of this disclosure.

FIG. 9 is a schematic diagram of the beam failure recovery device of Embodiment 7. As shown in FIG. 9, a beam failure recovery device 700a includes:
a second indicating unit 702 configured to transmit to a terminal equipment second signaling indicating a cell, and/or a bandwidth part (BWP), and or a control resource set (CORESET) monitoring and/or receiving a downlink signal.

The terminal equipment may, according to indication of the second signaling, determine a cell, a BWP, a control resource set (CORESET) or a search space at which the downlink signal is received.

For example, the second signaling includes mapping relationships between cells, and/or BWPs, and/or control resource sets (CORESETs) or search spaces. The terminal equipment may receive the downlink signal on a corresponding CORESET or search space according to the mapping relationships with reference to cell information indicated by high-layer signaling and an active BWP on the cell.

Furthermore, as shown in FIG. 9, the device 700a further includes:
a third indicating unit 703 configured to transmit a beam failure recovery (BFR) response to the terminal equipment.

Description of the third indicating unit 703 is identical that in Embodiment 6.

Embodiment 8

Embodiment 8 provides a network device. As a principle of the device for solving problems is similar to that of the method of Embodiment 4 or 5, reference may be made to implementation of the method of Embodiment 4 or 5 for implementation of this device, with identical parts being not going to be described herein any further.

Figure 10:
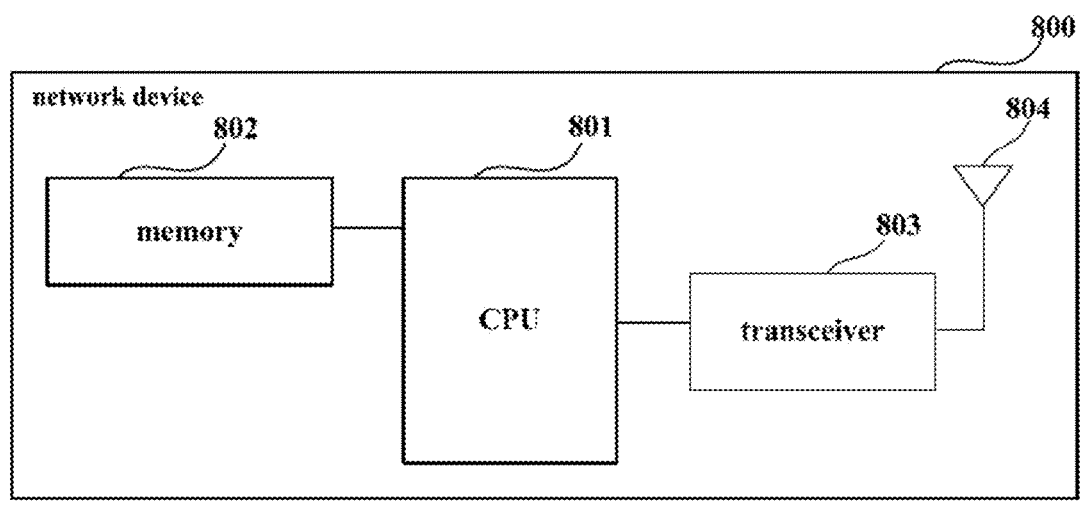
FIG. 10 is a schematic diagram of the network device of Embodiment 8 of this disclosure.

FIG. 10 is a schematic diagram of a structure of the network device of the embodiment of this disclosure. As shown in FIG. 10, a network device 800 may include a central processing unit (CPU) 801 and a memory 802, the memory 802 being coupled to the central processing unit 801. The memory 802 may store various data, and furthermore, it may store a program for data processing, and execute the program under control of the central processing unit 801.

In one implementation, the functions of the device 700 or 700a described in Embodiment 6 or 7 may be integrated into the central processing unit 801. The central processing unit 801 may be configured to carry out the method in Embodiment 4 or 5.

For example, the central processing unit 801 may be configured to perform control so that the network device 800 carries out the method in Embodiment 4 or 5.

Furthermore, reference may be made to Embodiment 4 or 5 for other configurations of the central processing unit 801, which shall not be described herein any further.

In another implementation, the device 700 or 700a and the central processing unit 801 may be configured separately; for example, the device 700 or 700a may be configured as a chip connected to the central processing unit 801, such as the unit shown in FIG. 8, and the functions of the device 700 or 700a are executed under control of the central processing unit 801.

Furthermore, as shown in FIG. 8, the network device 800 may further include a transceiver 803, an antenna 804, a display, an audio process, and a power supply, etc.; wherein functions of the above components are similar to those in the related art, and shall not be described herein any further. It should be noted that the network device 800 does not necessarily include all the parts shown in FIG. 8. Furthermore, the network device 800 may include parts not shown in FIG. 8, and the related art may be referred to.

Embodiment 9

The embodiment of this disclosure provides a communication system, at least including the network device as described in Embodiment 8 and the terminal equipment 500 as described in Embodiment 3, contents of Embodiment 3 and Embodiment 8 being incorporated herein, which shall not be described herein any further.

An embodiment of this disclosure provides a computer storage medium, including a computer readable program, which will cause a beam failure recovery device or a terminal equipment to carry out the beam failure recovery method as described in Embodiment 1.

An embodiment of the present disclosure provides a computer readable program, which, when executed in a beam failure recovery device or a terminal equipment, will cause the beam failure recovery device or the terminal equipment to carry out the beam failure recovery method as described in Embodiment 1.

An embodiment of this disclosure provides a computer storage medium, including a computer readable program, which will cause a beam failure recovery device or a network device to carry out the beam failure recovery method as described in Embodiment 4 or 5.

An embodiment of the present disclosure provides a computer readable program code, which, when executed in a beam failure recovery device or a network device, will cause the beam failure recovery device or the network device to carry out the beam failure recovery method as described in Embodiment 4 or 5.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 4, 8 and 9 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 4, 8 and 9 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 4, 8 and 9 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

Following supplements are further provided in this disclosure.

1. A beam failure recovery method, applicable to a terminal equipment, the method including:
   after a period of time upon a terminal equipment receives a beam failure recovery (BFR) response and before activation or reconfiguration signaling, monitoring and/or receiving a downlink signal by the terminal equipment in a first cell according to an antenna quasi-co-located (QCL) parameter identical to a selected reference signal (q_new) or a reference signal (q_new) indicated by a higher layer.

2. The method according to supplement 1, wherein, the downlink signal includes at least one of the following: a physical downlink control channel (PDCCH), a physical downlink shared channel (PDSCH), a channel state information reference signal (CSI-RS), and a synchronization signal block (SSB).

3. The method according to supplement 2, wherein, in a case where there exists an occasion for monitoring the physical downlink control channel (PDCCH) in the first cell, the terminal equipment monitors the physical downlink control channel (PDCCH) in the first cell.

4. The method according to supplement 2, wherein,
the physical downlink shared channel (PDSCH) includes:
a physical downlink shared channel (PDSCH) in the first cell; or
in a case where there exists an occasion for monitoring the physical downlink control channel (PDCCH) in the first cell, a physical downlink shared channel (PDSCH) scheduled by the monitored physical downlink control channel (PDCCH); or
a physical downlink shared channel (PDSCH) scheduled by a physical downlink control channel (PDCCH) receiving the beam failure recovery (BFR) response.

5. The method according to any one of supplements 1-4, wherein,
the beam failure recovery (BFR) response has a downlink control signaling (DCI) format scrambled by a cell radio network temporary identifier (C-RNTI) or modulation and coding scheme cell radio network temporary identifier (MCS-C-RNTI) cyclic redundancy check.

6. The method according to any one of supplements 1-5, wherein,
the beam failure recovery (BFR) response is detected in a search space of a beam failure recovery random access response (BFR RAR).

7. The method according to supplement 6, wherein,
the beam failure recovery (BFR) response is a first physical downlink control channel (PDCCH) in the search space.

8. The method according to any one of supplements 1-7, wherein,
the period of time is expressed as:
an absolute time; or
the number of slots or symbols associated with a subcarrier spacing.

9. The method according to supplement 8, wherein,
the subcarrier spacing includes:
a subcarrier spacing of the first cell; or,
a subcarrier spacing of a cell in which the beam failure recovery (BFR) response is received.

10. The method according to supplement 8, wherein,
a length of the period of time is related to a performance of the terminal equipment.

11. The method according to any one of supplements 1-10, wherein,
a starting point (T1) of the period of time is:
a slot receiving the beam failure recovery (BFR) response; or
a last symbol of the beam failure recovery (BFR) response; or
a last symbol in a control resource set receiving the beam failure recovery (BFR) response.

12. The method according to any one of supplements 1-11, wherein,
an ending point (T2) of the period of time is:
a slot used for receiving the downlink signal; or
a first symbol in a control resource set (CORESET) or a search space used for monitoring the downlink signal; or
a first symbol of the downlink signal.

13. The method according to any one of supplements 1-12, wherein the downlink signal includes a physical downlink control channel (PDCCH), and the control resource set (CORESET) or the search space used for monitoring the downlink signal satisfies at least one of the following conditions:
all control resource sets (CORESETs) or search spaces on an active bandwidth part (BWP) in the first cell to which the physical downlink control channel (PDCCH) corresponds;
that the control resource sets (CORESETs) or search spaces to which the physical downlink control channel (PDCCH) corresponds are default control resource sets (CORESETs) or search spaces; and
that the control resource sets (CORESETs) or search spaces to which the physical downlink control channel (PDCCH) corresponds are control resource sets (CORESETs) or search spaces indicated via radio resource control (RRC) signaling.

14. The method according to any one of supplements 1-13, wherein,
the activation or reconfiguration signaling includes:
activation or reconfiguration signaling for the first cell; or
activation or reconfiguration signaling for a second cell associated with the first cell; or
activation or reconfiguration signaling for a primary cell of the terminal equipment.

15. The method according to any one of supplements 1-14, wherein,
the activation or reconfiguration signaling includes:
MAC-CE signaling for activating a TCI state of a control resource set (CORESET) to which the downlink signal corresponds; or
MAC-CE signaling for activating a TCI state set to which the downlink signal corresponds; or
radio resource control (RRC) signaling for reconfiguring a TCI state set of a control resource set (CORESET) to which the downlink signal corresponds; or
radio resource control (RRC) signaling for reconfiguring a TCI state set to which the downlink signal corresponds.

16. The method according to any one of supplements 1-15, wherein,
the first cell includes:
a cell to which cell information reported by the terminal equipment to the network device corresponds; or
a cell associated with a cell to which cell information reported by the terminal equipment to the network device corresponds; or
a cell indicated by a higher layer of the terminal equipment; or
a cell associated with a cell indicated by a higher layer of the terminal equipment; or
a cell associated with a cell receiving the beam failure recovery (BFR) response.

17. The method according to supplement 16, wherein,
an association relationship between the cell to which cell information reported by the terminal equipment to the network device corresponds and the cell associated with the cell is configured by radio resource control (RRC) signaling.

18. The method according to supplement 16, wherein,
an association relationship between the cell indicated by a higher layer of the terminal equipment and the cell associated with the cell is configured by radio resource control (RRC) signaling.

19. The method according to supplements 1-18, wherein,
the selected reference signal (q_new) is selected from a list containing a set of reference signals (RS) used for determining beam failure recovery (BFR) candidate beams.

20. The method according to any one of supplements 1-19, wherein the method further includes:
  reporting information on the selected reference signal (q_new) by the terminal equipment to the network device.
21. The method according to supplement 20, wherein, the terminal equipment reports the information on the selected reference signal (q_new) to the network device via an MAC-CE message, a physical uplink control channel (PUCCH), or a physical random access channel (PRACH).
22. The method according to any one of supplements 1-21, wherein,
  the reference signal indicated by the higher layer is a reference signal (q_new) indicated by the higher layer most recently.
23. The method according to any one of supplements 1-22, wherein,
  the first cell is not configured with an RAR search space used for receiving the beam failure recovery (BFR) response.
24. The method according to any one of supplements 1-22, wherein,
  the first cell is configured with an RAR search space used for receiving the beam failure recovery (BFR) response.
25. A beam failure recovery method, applicable to a network device, the method including: transmitting by a network device to a terminal equipment first signaling indicating to jointly perform beam failure recovery by two or more cells of the terminal equipment.
26. A beam failure recovery method, applicable to a network device, the method including: transmitting by a network device to a terminal equipment second signaling indicating a cell, and/or a bandwidth part (BWP), and or a control resource set (CORESET) monitoring and/or receiving a downlink signal.
27. The method according to supplement 26, wherein, the second signaling includes mapping relationships between cells, and/or BWPs, and/or control resource sets (CORESETs) or search spaces.
28. The method according to any one of supplements 25-27, wherein the method further includes:
  transmitting a beam failure recovery (BFR) response by the network device to the terminal equipment.

What is claimed is:

1. A beam failure recovery device configured to operate a terminal equipment, the beam failure recovery device comprising:
  a memory; and
  processor circuitry coupled to the memory and configured to:
    upon the terminal equipment receive a beam failure recovery (BFR) response, and after a period of time, monitor a downlink signal(s) in a first cell(s) of the terminal equipment according to an antenna quasi-co-located (QCL) parameter identical to a selected reference signal(s) (q_new) or a reference signal(s) (q_new) indicated by a higher layer,
  wherein the period of time is a number of symbols associated with a subcarrier spacing, and
  wherein the subcarrier spacing is according to:
  a subcarrier spacing of one of the first cell(s) for the reception of the downlink signal(s).

2. The beam failure recovery device according to claim 1, wherein,
  the downlink signal comprises at least one of the following:
    a physical downlink control channel (PDCCH), a physical downlink shared channel (PDSCH), a channel state information reference signal (CSI-RS), and a synchronization signal block (SSB).
3. The beam failure recovery device according to claim 2, wherein,
  in a case where there exists an occasion for monitoring the physical downlink control channel (PDCCH) in the first cell, the receiver monitors the physical downlink control channel (PDCCH) in the first cell.
4. The beam failure recovery device according to claim 2, wherein,
  the physical downlink shared channel (PDSCH) comprises:
    a physical downlink shared channel (PDSCH) in the first cell; or
    in a case where there exists an occasion for monitoring the physical downlink control channel (PDCCH) in the first cell, a physical downlink shared channel (PDSCH) scheduled by the monitored physical downlink control channel (PDCCH); or
    a physical downlink shared channel (PDSCH) scheduled by a physical downlink control channel (PDCCH) receiving the beam failure recovery (BFR) response.
5. The beam failure recovery device according to claim 1, wherein,
  the beam failure recovery (BFR) response has a downlink control signaling (DCI) format scrambled by a cell radio network temporary identifier (C-RNTI) or modulation and coding scheme cell radio network temporary identifier (MCS-C-RNTI) cyclic redundancy check.
6. The beam failure recovery device according to claim 1, wherein,
  the beam failure recovery (BFR) response is detected in a search space of a beam failure recovery random access response (BFR RAR).
7. The beam failure recovery device according to claim 6, wherein,
  the beam failure recovery (BFR) response is a first physical downlink control channel (PDCCH) in the search space.
8. The beam failure recovery device according to claim 1, wherein,
  a starting point (T1) of the period of time is:
  a slot receiving the beam failure recovery (BFR) response; or
  a last symbol of the beam failure recovery (BFR) response; or
  a last symbol in a control resource set receiving the beam failure recovery (BFR) response.
9. The beam failure recovery device according to claim 1, wherein,
  an ending point (T2) of the period of time is:
  a slot used for receiving the downlink signal; or
  a first symbol in a control resource set (CORESET) or a search space used for monitoring the downlink signal; or
  a first symbol of the downlink signal.
10. The beam failure recovery device according to claim 1, wherein the downlink signal comprises a physical downlink control channel (PDCCH), and the control resource set (CORESET) or the search space used for monitoring the downlink signal satisfies at least one of the following conditions:
- all control resource sets (CORESETs) or search spaces on an active bandwidth part (BWP) in the first cell to which the physical downlink control channel (PDCCH) corresponds;
- that the control resource sets (CORESETs) or search spaces to which the physical downlink control channel (PDCCH) corresponds are default control resource sets (CORESETs) or search spaces; and
- that the control resource sets (CORESETs) or search spaces to which the physical downlink control channel (PDCCH) corresponds are control resource sets (CORESETs) or search spaces indicated via radio resource control (RRC) signaling.

11. The beam failure recovery device according to claim 1, wherein,
the activation or reconfiguration signaling comprises:
activation or reconfiguration signaling for the first cell; or
activation or reconfiguration signaling for a second cell associated with the first cell; or
activation or reconfiguration signaling for a primary cell of the terminal equipment.

12. The beam failure recovery device according to claim 1, wherein,
the activation or reconfiguration signaling comprises:
MAC-CE signaling for activating a TCI state of a control resource set (CORESET) to which the downlink signal corresponds; or
MAC-CE signaling for activating a TCI state set to which the downlink signal corresponds; or
radio resource control (RRC) signaling for reconfiguring a TCI state set of a control resource set (CORESET) to which the downlink signal corresponds; or
radio resource control (RRC) signaling for reconfiguring a TCI state set to which the downlink signal corresponds.

13. The beam failure recovery device according to claim 1, wherein,
the first cell comprises:
a cell(s) where beam failure is detected, and to which cell ID(s) reported by the terminal equipment to the network device corresponds.

14. The beam failure recovery device according to claim 1, wherein,
the reference signal indicated by the higher layer is a reference signal (q_new) indicated by the higher layer most recently.

\* \* \* \* \*